Nov. 7, 1967  K. E. PERRY  3,351,951
STEPPING CIRCUITS FOR RECORDING APPARATUS
Filed April 19, 1966
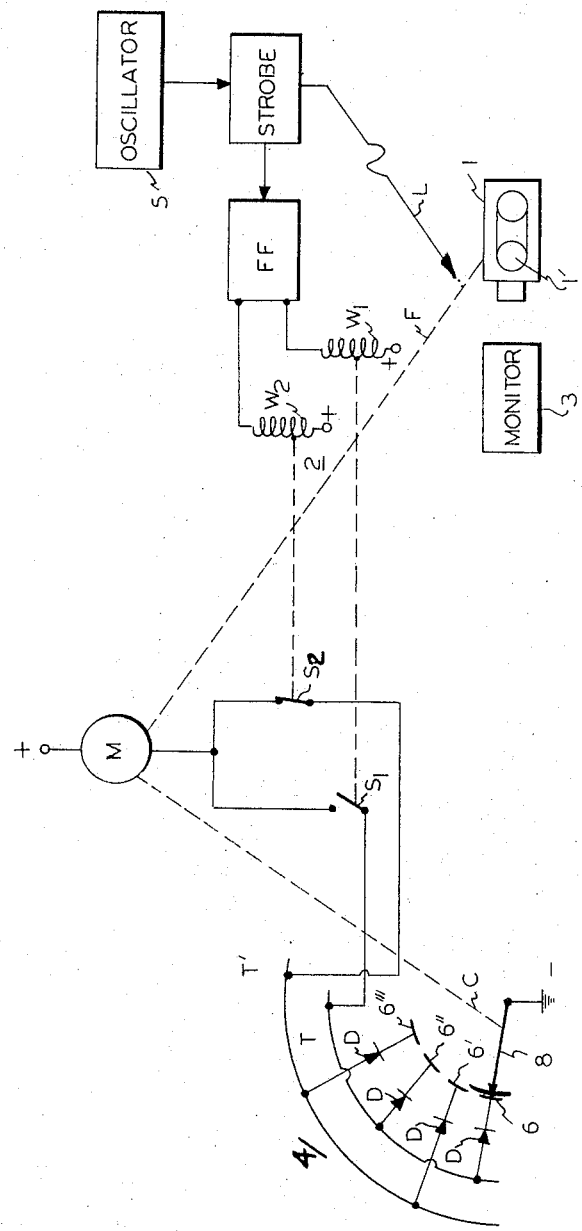
INVENTOR
KENNETH E. PERRY
BY  Rines and Rines
ATTORNEYS

United States Patent Office 3,351,951
Patented Nov. 7, 1967

3,351,951
STEPPING CIRCUITS FOR RECORDING
APPARATUS
Kenneth E. Perry, Wayland, Mass., assignor to Geodyne Corporation, Waltham, Mass., a corporation of Massachusetts
Filed Apr. 19, 1966, Ser. No. 543,730
9 Claims. (Cl. 346—107)

The present invention relates to stepping circuits for recording apparatus, being more particularly, though not exclusively, directed to strobed film-recording apparatus and the like.

Numerous types of advancing circuits have been proposed and used for enabling successive film frame or other recordings at successive intervals of time. There are important applications and uses, however, such as compact underwater monitoring equipment or the like, where circuit simplicity, small size, low power consumption and a relatively high degree of timing reliability are simultaneously required. Conventional alternating-current drive motors, for example, not only introduce circuit operational complexities in such specialized applications, but inherently consume considerably more power than a battery-source system can tolerate over long periods of time. Conventional stepping motors, moreover, do not enable sufficient film advancement for many types of measurements and recordings and require gearing to adapt them to accomplish such purposes, being relatively expensive as well. And the prior use of expensive speed-controlled motors has been found to be unreliable in many instances, such techniques requiring not only a motor timing or control circuit, but a separate timing oscillator for the strobing or other recording process, the two timing circuits necessarily requiring sufficient complexity to provide stability to the degree that they at least stay close to each other in approximate synchronization.

An object of the present invention, accordingly, is to provide a new and improved stepping circuit apparatus for recording systems and the like that shall not be subject to the above-described disadvantages but that, to the contrary, enables the use of simple and highly reliable components of vastly lower power consumption, and is controlled by but a single timing or control circuit.

A further object is to provide a novel circuit of the above-described character that is particularly suited for compact battery-operated systems such as underwater strobed film-recording instrumentation and similar apparatus.

Still another object is to provide a novel stepping circuit of more general application and utility, also.

Other and further objects will be explained hereinafter and are more particularly delineated in the appended claims.

In summary, the objectives above discussed are attained through the use of a pair of groups of alternately connected-together switch commutator segments operating with a contactor that is movable in steps in response to a relay control for completing the energizing circuit of, preferably, a simple D.C. motor. The relay is in turn operated preferably at the termination of successive timing impulses to produce stepping of the motor, the timing impulses also controlling the strobing of a film-recording system, the film of which is advanced by the stepping motor. Preferred details are hereinafter more fully treated.

The invention will now be described with reference to the accompanying drawing, the single figure of which is a combined schematic and block diagram of a preferred embodiment.

Referring to the drawing, a recording camera is shown at 1 containing a film-driving loop 1' for the purpose of recording successive readings or the like of a monitoring or sensing system 3 upon successively spaced portions of the film. To this end, the indicator or other portion of the apparatus 3 to be photographically recorded, is strobed at successive instants of time, as schematically represented by the light-flash arrow L from a strobe circuit of any conventional type labelled "STROBE." The film drive 1' is then advanced, under the control of a motor M (as schematically indicated by the dotted-line gang connection F) to present the next successive region of the film for the next light flash or strobe at L.

In accordance with the invention, all timing control for the stepping of the motor M, the strobe or flash L and the film drive 1' emanates from a single oscillator or other equivalent periodic timing source 5, without any requirement for multiple timing controls, speed-control circuits or the other complexities before discussed. The motor M is stepped in synchronism with the periodic timing impulses that generate the strobe through a relay control, generally indicated at 2, and a commutator switch 4.

The switch 4 is shown having a plurality of successively positioned switch commutator segments 6, 6', 6'', 6''', etc., preferably in circular form, divided into two groups of alternately connected-together segments 6–6'', etc. and 6'–6''', etc. The commutator segments 6–6'', etc. are connected together to a common terminal T, preferably through diodes D that prevent interaction with other circuit functions associated with the apparatus; and the segments of the other group of commutator segments 6'–6''', etc. connect to common terminal T'. A rotor contactor 8, driven by the motor M, as indicated at C, engages successive commutators 6, 6', 6'', etc. under the control of relay switches $S_1$ and $S_2$, in turn operated by respective relay windings $W_1$ and $W_2$ of the relay control 2. When $S_1$ is open, as shown, and the contactor 8 is connected with a segment of group 6–6'', etc. (shown as the commutator segment 6), no power can flow from the battery or other preferably D.C. source +, —, through a simple D.C. motor M; and it thus de-energized and stationary.

If relay winding $W_1$ becomes energized by the complementing or changing of state of the output of a flip-flop FF, in response to a strobe impulse, switch $S_1$ will be closed and the motor-energizing circuit will become completed from the — terminal through the path 8–6–T–$S_1$–M to the + terminal, causing the motor M to advance or step the contactor 8 to the next commutator segment 6'. With the further relay winding $W_2$ connected to the out-of-phase output of the flip-flop FF, switch $S_2$ then opens, so that when the contactor 8 reaches the next segment 6', the motor energizing circuit will open-circuit and the motor will stop at that step. The film drive 1', moreover, will synchronously advance the film to the next recording region thereof and stop.

By biasing the flip-flop FF to respond to the trailing or terminating edge portion of each successive strobe impulse, the flip-flop will thereupon complement or change its state, controlling, through out-of-phase output relay windings $W_1$ and $W_2$, the alternate opening and closing, respectively, of relay switches $S_1$ and $S_2$ and thus the successive moving of contactor 8 to successive contactor segments and the stepping operation of motor M. The strobe flash L, however, will be produced at the onset of each timing impulse while the motor M, contactor 8 and film drive 1' are stationary. The photographic recording is thus effected prior to the stepping of the motor M to the next stepping position and thus prior to advancement of the film to its next position.

By dimensioning the successive contactor segments, as shown, or by other equivalent techniques, the contactor 8 can be made to make contact with the next commutator segment before breaking with the preceding segment, such that there is no spurious interruption of current in the motor-energizing circuit that could irregularize the steps.

Thus a very simple, inexpensive, but highly reliable stepping control circuit is attained, operating with a single timing source that also controls the strobe recording, and using low-power components. The illustrated circuit, for example, has been successfully operated for underwater film recording purposes with a 12-volt battery +, — and D.C. motor M, an oscillator 5 of ⅕ c.p.s. frequency and a circular twelve-segment commutator switch 4 requiring one-twelfth of a complete revolution of the rotor contactor 8 each complete stepped revolution of the motor M. Such a system provided sufficient successive film advancement for five-second interval recording of the reading of underwater monitoring sensors 3.

While no motor speed control circuits or other complexities are required, it is only necessary that the speed of the simple D.C. motor M, for example, be at least fast enough to move the contactor 8 to the next commutator segment before the next timing impulse; i.e. during the period between successive impulses.

Though the invention has been described in connection with film recording, clearly other types of recording media may also be employed; and, as before stated, the stepping switch control circuit is also useful in other applications, as well. Further modifications will also occur to those skilled in the art and all such are considered to fall within the spirit and scope of the invention as defined in the appended claims.

What is claimed is:

1. Stepping circuit apparatus having, in combination, switching means comprising a plurality of successively positioned switch commutator segments successively contactable by a movable contactor, the segments being divided into two groups of alternately connected-together segments, motor means for controlling the movement of the movable contactor, relay means for alternately connecting one segment group and then the other to the motor means to energize the same in steps, means for producing periodic timing impulses, recording means having a movable recording medium the movement of which is controlled in accordance with the stepping of the motor means, means responsive to the onset of each timing impulse for effecting recording upon the recording medium, and means responsive to the termination of each timing impulse for controlling the relay means in order to energize the motor means to move the contactor one segment and thus advance the motor means one step and synchronously to move the recording medium a predetermined distance for the next recording, the speed of the motor means being adjusted such that in stepping it moves the contactor from one segment to the next in the interval between successive periodic timing impulses.

2. Apparatus as claimed in claim 1 and in which the recording means comprises a camera having a film drive controlled synchronously with the motor means, and the timing impulse producing means comprises strobe means for enabling recording upon the camera film at the onset of the strobe and prior to the stepping of the motor means.

3. Apparatus as claimed in claim 1 and in which the commutator segments and the contactor are disposed to enable the making of contact with a segment during a step of the motor means prior to breaking contact with the previous segment.

4. Apparatus as claimed in claim 1 and in which the timing impulse producing means comprises oscillator means for controlling the periodicity of the impulses, and in which there is provided flip-flop means responsive to the terminating portion of said impulses for changing its state, the flip-flop means being connected to the relay means to effect connection to alternate commutator segment groups each change of the state of the flip-flop means.

5. Apparatus as claimed in claim 4 and in which the said relay means comprises winding means connected in the output of the flip-flop means and switching means movable in response to energization of the winding means connected between the groups of commutator segments and the motor means in an electric motor drive circuit.

6. Apparatus as claimed in claim 5 and in which the relay means comprises two separate opposite phase winding-and-switching means, one winding means connected with each flip-flop output and one switching means connected to each group of commutator segments, one switching means being open when the other is closed.

7. Apparatus as claimed in claim 5 and in which interaction-preventing diode means are connected between each commutator segment and its connection to the relay means.

8. Apparatus as claimed in craim 5 and in which the said motor means comprises a D.C. motor and the said drive circuit is a battery circuit.

9. Stepping circuit apparatus having, in combination, switching means comprising a plurality of successively positioned switch commutator segments successively contactable by a movable contactor, the segments being divided into two groups of alternately connected-together segments, motor means for controlling the movement of the movable contactor, relay means for alternately connecting one segment group and then the other to the motor means to energize the same in steps, means for producing periodic timing impulses, and means responsive to at least a portion of each timing impulse for controlling the relay means in order to energize the motor means to move the contactor one segment and thus advance the motor means one step, the speed of the motor means being adjusted such that in stepping it moves the contactor from one segment to the next in the interval between successive periodic timing impulses.

References Cited

UNITED STATES PATENTS

| | | | |
|---|---|---|---|
| 2,441,185 | 5/1948 | Brown et al. | 352—173 |
| 2,606,808 | 12/1952 | Brown | 346—107 X |
| 2,897,605 | 8/1959 | Kerns | 346—107 X |

RICHARD B. WILKINSON, *Primary Examiner.*

J. W. HARTARY, *Assistant Examiner.*